(12) United States Patent
Chen et al.

(10) Patent No.: US 8,065,298 B2
(45) Date of Patent: *Nov. 22, 2011

(54) CONCEPT NETWORK

(75) Inventors: Zheng Chen, Beijing (CN); Wei-Ying Ma, Beijing (CN); Shengping Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/181,251

(22) Filed: Jul. 28, 2008

(65) Prior Publication Data

US 2008/0281821 A1 Nov. 13, 2008

Related U.S. Application Data

(62) Division of application No. 10/427,550, filed on May 1, 2003, now Pat. No. 7,406,459.

(51) Int. Cl.
G06F 17/30 (2006.01)

(52) U.S. Cl. ........................................ 707/726; 715/205

(58) Field of Classification Search .................. 707/609, 707/637, 705, 713, 726, 769, 802, 821; 715/205, 715/206, 207; 719/315
See application file for complete search history.

(56) References Cited

U.S. PATENT DOCUMENTS

| | | | |
|---|---|---|---|
| 5,842,206 A | 11/1998 | Sotomayor | |
| 6,098,081 A | 8/2000 | Heidorn et al. | |
| 6,182,062 B1 | 1/2001 | Fujisawa et al. | |
| 6,233,591 B1 | 5/2001 | Sherman et al. | |
| 6,286,002 B1 | 9/2001 | Axaopoulos et al. | |
| 6,356,910 B1 | 3/2002 | Zellweger | |
| 6,385,579 B1 | 5/2002 | Padmanabhan et al. | |
| 6,389,436 B1 | 5/2002 | Chakrabarti et al. | |
| 6,424,973 B1 | 7/2002 | Baclawski | |
| 6,823,491 B1 | 11/2004 | McBrearty et al. | |
| 7,376,635 B1 * | 5/2008 | Porcari et al. .......................... 1/1 | |
| 2002/0099700 A1 | 7/2002 | Li | |
| 2002/0147805 A1 * | 10/2002 | Leshem et al. ................ 709/223 |
| 2003/0020749 A1 * | 1/2003 | Abu-Hakima et al. ....... 345/752 |

OTHER PUBLICATIONS

Kim et al, A Personalized Web Search Engine Using Fuzzy Concept Network with Link Structure,2001 IEEE, pp. 81-86.*
Information retrieval and the Web, geust Editors: Ricardo Baeza, Peter Schauble vol. III, No. 3, Jun. 2002.
Kim et al., "A Personalized Web Search Engine Using Fuzzy Concept Network with Link Structure", 2001, IEEE, pp. 8.
Verardi, et al., "Using Text Processing Techniques to Automatically Enrich a Domain Ontology", ACM, 2001, pp. 270-284.
Weideman et al., "Concept Mapping Vs. Web Page Hyperlinks as an Information Retrieval Interface-Preferences of Postgraduate Culturally Diverse Learners"SAICSIT, 2003, pp. 14.
Berendt, et al., "Towards Semantic Web Mining", The Semantic Web Conference, First International Web Conference, Lecture Notes in Computer Science, vol. 2342, Jun. 12, 2009, pp. 264-278.

* cited by examiner

*Primary Examiner* — Fred I Ehichioya
(74) *Attorney, Agent, or Firm* — Lee & Hayes, PLLC

(57) ABSTRACT

A concept network that can be generated in response to a user query. Various embodiments include analysis of structure information, for example, where such information is based at least in part on Universal Resource Locators (URLs) of Web sites or data storage locations. A concept network may be used with a search tool where the search tool searches a plurality of sites (e.g., Web sites, data storage locations, etc.). In such an example, each site location is arranged with a node. Certain ones of the nodes are connected by at least one link. The concept network selects a portion of certain ones of the nodes based on the link, wherein the at least one link is used for content purposes.

16 Claims, 6 Drawing Sheets

CONCEPT NETWORK

RELATED APPLICATIONS

This patent application is a divisional application of U.S. patent application Ser. No. 10/427,550, filed on May 1, 2003, entitled "Concept Network" (now U.S. Pat. No. 7,406,459, issued Jul. 29, 2008). The foregoing U.S. patent application Ser. No. (10/427,550) and U.S. Pat. No. (7,406,459) are incorporated by reference herein.

TECHNICAL FIELD

This disclosure relates to search tools, and more particularly to displayed searched results.

BACKGROUND

With the rapid growth of such networks as the Internet, the accuracy and quality of searches becomes more and more important. However, many users find that searching using search engines yields a large number (perhaps thousands) of results, many of which are not closely applicable to their submitted query. As such, many users become dissatisfied with the search results. Some users also find that the large number of returned results for queries obscure important information contained in the Internet.

Most prior-art search engines are primarily based on a keyword comparison. Consider a query asking for the top N digital camera manufacturers in the world, where N is an integer. Keyword comparison search engines would return some Web pages that contain the key term "digital camera" and other Web pages that contain the key term "manufacturers". Therefore, the percentage of the total returned results that relate to digital camera manufacturers that are returned in keyword comparison search engines is relatively small. The keyword comparison search engine also has no way to compare whether a particular digital camera manufacturer is larger or better known (or some other quantifiable comparison) than another digital camera manufacturer based on their Web pages. As such, prior-art search engines, being primarily based on keyword comparisons, often lead to the large number of results many of which are marginally related to the query. Such keyword comparison search engines cannot identify the most applicable ones of a plurality of searched Web sites based on the structure of the Web sites.

In another aspect, many users believe that they have to search through a large number of queries to obtain useful search results. As such, the users believe that the queries (and the examination of the search results for relevancy) demand a considerable amount of time to ensure that all relevant responses are considered. Even after such time is spent, the users often believe that the most significant search results may be lost within a vast amount of irrelevant information.

In yet another aspect, many Internet applications utilize such lexicography tools as WordNet® ((developed at Princeton University under the direction of Prof. George A. Miller) to expand the user's query to improve the precision of the search engine. WordNet is an online lexical reference system. With WordNet, nouns, verbs, adjectives and adverbs are organized into synonym sets, each representing one underlying lexical concept. Different relationships link the synonym sets. With WordNet, users manually input their personal taxonomy relative to Web pages. Therefore, WordNet is not suitably configured to keep up with the rapid growth and dynamic changes of Internet and other networked computer systems. For example, over half of the words in the Web do not appear in WordNet.

SUMMARY OF THE INVENTION

This invention relates to a concept network. The concept network can be generated in response to a user query. In one embodiment, the concept network is being used with a search tool. The search tool searches a plurality of data storage locations. Each data storage location is arranged with a node. Certain ones of the nodes are connected by at least one link. The concept network selects a portion of certain ones of the nodes based on the link, wherein the at least one link is used for content purposes.

BRIEF DESCRIPTION OF THE DRAWINGS

Throughout the drawings, the same numbers reference like features and components.

DETAILED DESCRIPTION

This disclosure provides a variety of embodiments of concept networks. In concept networks, the query is equated to a concept that is being searched. In concept networks, a plurality of search result information is structurally organized into a plurality of concepts that is displayed to the user. Concept networks, as disclosed herein, retrieve and/or display search results (the search results are arranged based on the concepts) according to the relevancy of the search results to the various concepts of the query. Concept networks can be configured to allow users to access a variety of search results, a variety of contents of the search results, or a variety of portions of search results based on the relevancy of the search results to the user query. Such concept networks are generated in computer environments based on the query. One aspect of the term "concept network" relates to the grouping of concepts into the concept network in a fashion such that the concepts can be understood and accessed by the user.

One embodiment of concept networks are particularly directed to the Internet, even though concept networks in general can be applied to any computer environment or computer system. In the Internet embodiment of a concept network, a user may input a query, and the displayed output concept network might be a list of concepts that can be selected by the user. For example, if a user queries "electronic systems", the displayed concept networks may include a variety of concepts such as cellular telephones, computers, audio systems, video systems, etc. The user could thereupon select one of these concepts displayed as the concept network to display more specific search results.

Figure 3:
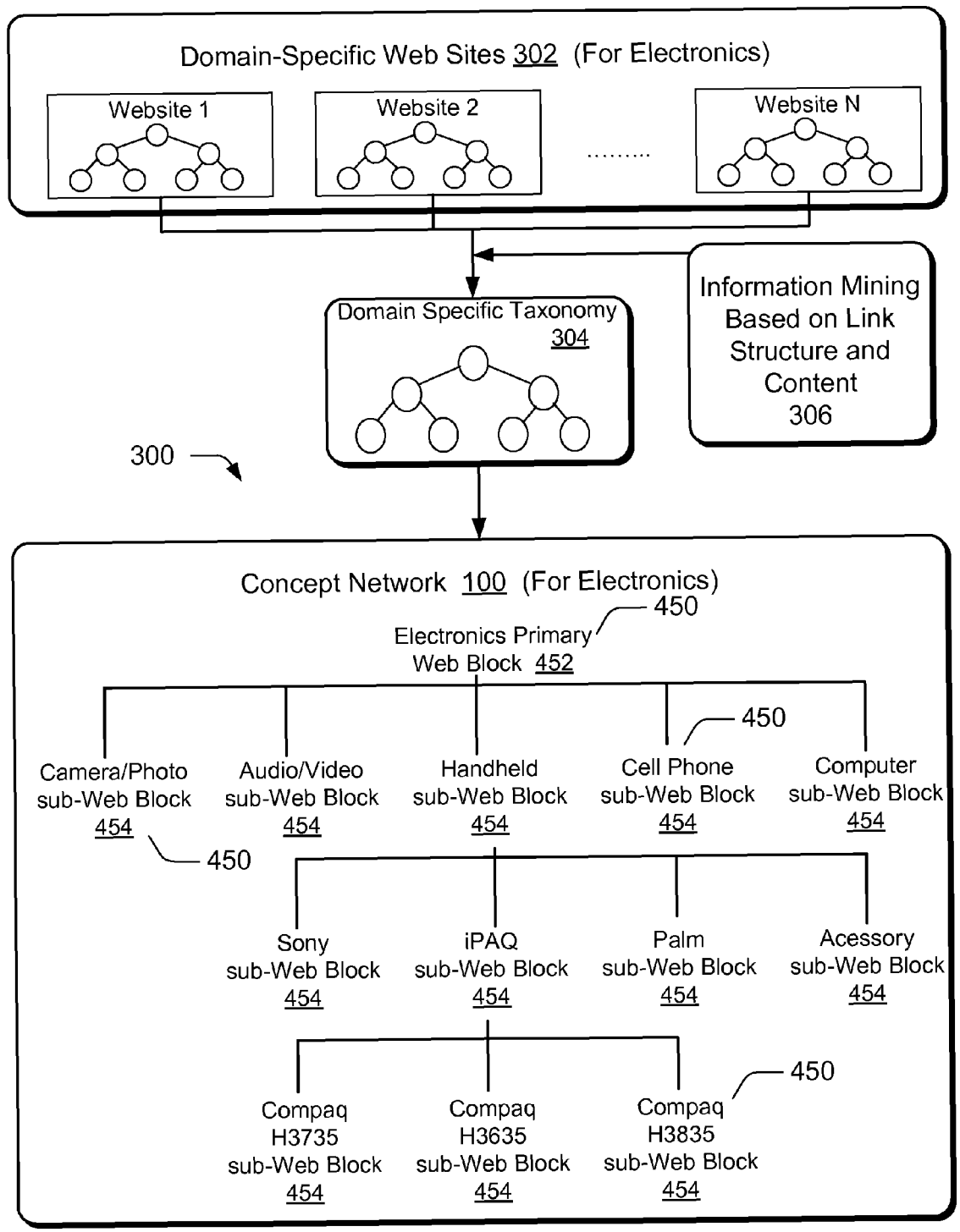
FIG. 3 illustrates a block diagram of one embodiment of taxonomy construction for a domain that is used to establish a concept network.

One embodiment of the concept network includes a large connection graph displaying multiple interconnected concepts such as described relative to FIG. 3. The concept network, as with search results from prior-art search engines, is derived based on user queries. Concept networks increase the accuracy of the response to a user query compared to prior art search engines. In addition, concept networks limit the large number of extraneous search results that are prevalent among prior-art search engines, the latter which rely on keyword queries.

Figure 1:
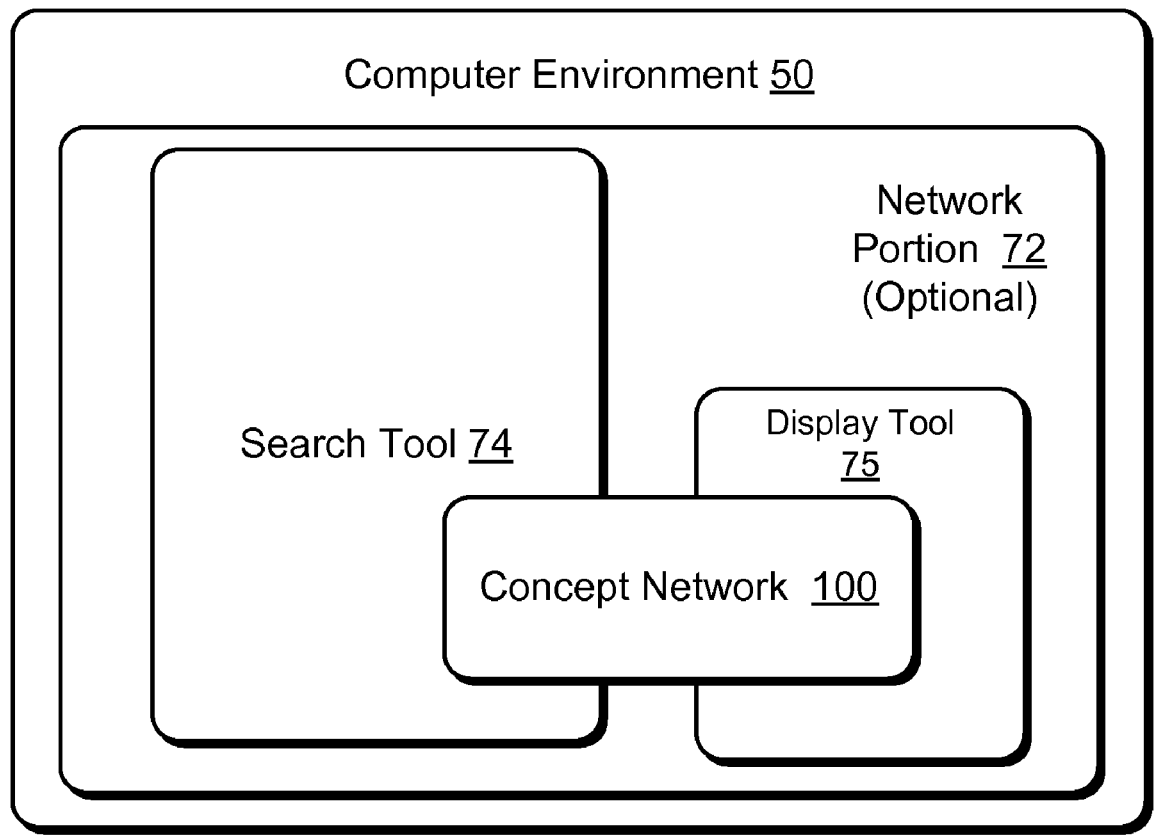
FIG. 1 is a block diagram of one embodiment of a computer environment including a concept network.

FIG. 1 illustrates a block diagram of an embodiment of a computer environment 50 that is configured to generate and display the concept network 100. The computer environment 50 can include an optional network portion 72 (although the computer can also be a stand-alone computer). The computer environment 50 includes a search tool 74 and a display tool 75. Portions of the search tool 74 and the display tool 75 include portions of one embodiment of the concept network 100. The concept network 100 is provided as a user interface by which a structured representation of the search results is displayed to the user, and the search results are structured, or arranged, according to concepts that can also be illustrated to the user to indicate the relevancy of each returned search result. Whereas prior-art search engines typically return a listing of applicable Web pages or the like, the returned concept network as disclosed in this disclosure includes, e.g., a plurality of Web pages structurally arranged according to their content. The search to generate the concept network 100 relies on the information contained within the searched data (e.g., a Web page), as indicted by some structural feature of the searched data. As such, the returned results of the concept network (that is based on structure of the searched data) generally provide more accurate search results than that of prior-art search engines (that are based on keyword matching).

The FIG. 1 computer environment 50 that includes the concept network 100 illustrates a generalized computer environment. It is envisioned that the concept network is highly applicable in any type of computer environment that could use search engines including stand-alone computers, networked computers, or mainframe computers. However, this disclosure is described as being applicable to particular embodiments of computer environments. More particularly, it is envisioned that the concept network 100 is applicable to networks. Even more particularly, it is envisioned that one embodiment of the computer environment 50 that includes the concept network 100 includes a variety of Web pages arranged on Web sites across the Internet. As such, certain embodiments of the concept network rely on servers that provide data forming the search results to the clients in networked computer environments such as the Internet. One embodiment of the structured representation of the search results that are displayed to the user is based on the Universal Resource Locator (URL) that is generally known to users of the Internet. The structural aspects of the URL that are used in certain embodiments of the Internet are described in this disclosure. While this disclosure describes the URL as providing structure to the data that is relied on in the concept network, it is emphasized that any other mechanism that can contain similar structural information that can be relied upon by a concept network is within the intended scope of the present disclosure.

In certain embodiments of the computer environment 50, a user submitting a query will result in a related concept network 100, in which the displayed results are organized into a series of related concepts. In general, a large variety of types of search results can be obtained based on a large variety of user queries. As such, the present disclosure describes the generation of a variety of concept networks based on a large number of user queries. One illustrative example of a concept network is yielded by searching for the "top N" queries (those queries that ask for the top "N" of any category where N is an integer). Another illustrative example of a concept network yields meaningful results in searches for a complex concept, such as "explain electronics." The concept network 100 is generated based on the concepts (not as with prior-art search engines that produce search results based on the actual keywords provided by the user's query). Concept networks 100 are generated in response to queries in a manner that they can provide more detailed and accurate information to the user. Certain embodiments of concept networks, for example, are generated considering a considerable number of Web sites that relate to the concept posed by the query. The concept network considers the relevancy of each Web site to the concept provided by the query, and then relevant portions of a variety of Web pages are illustrated over the concept network to the user.

The concept network 100 can display results from a variety of queries in a more organized and accurate fashion than prior-art search engines that rely on keyword query results. The fact that more directed and accurate query responses are included allows the concept network to deal with fewer Web pages in the display to the user. The relatively few Web pages that are generated by the concept network can then be organized according to their structure. For example, those Web pages that relate to one type of concept can be accessed through one portion of the concept network while those Web pages that relate to another type of concept can be accessed through another portion of the concept network. The concept network 100 therefore can contain the structure information relating to a large amount of retrieved information (such as Web sites, Web site content information, or portions of Web pages).

Figure 4:
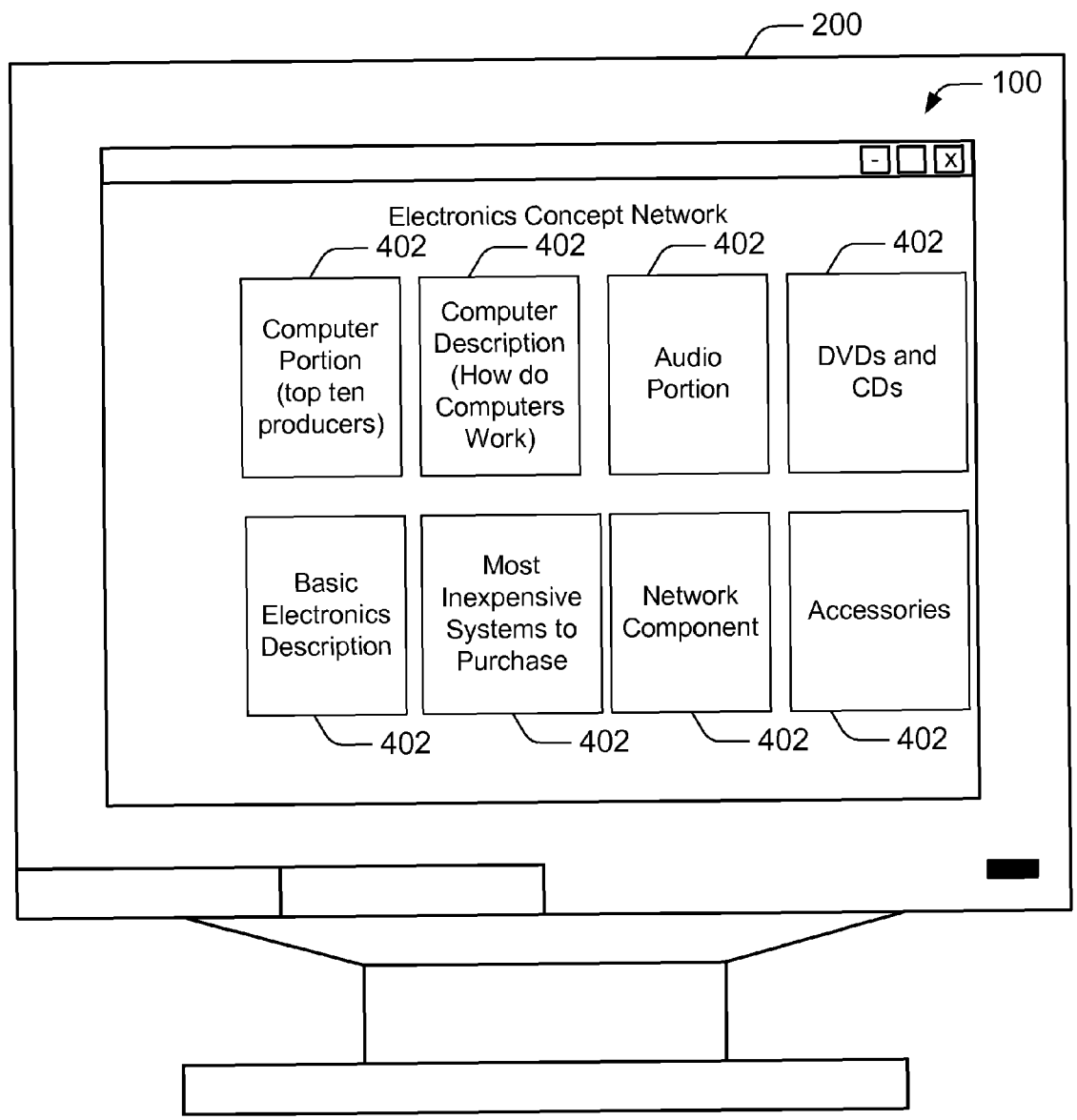
FIG. 4 illustrates a perspective view of displayed results of a concept network as it may appear on a display of a computer environment.

The concept network 100 provides a number of improvements over listings of Web pages that are returned by most prior-art search engines. Certain embodiments of concept network 100 instead provide and display structured information that is arranged in an order on a Web page (that displays the concept network). The automatically generated and displayed concept network 100, as illustrated in FIG. 4, is in a form that can be readily understood, interpreted, and is more useful to the user. The concept network 100 generally improves the precision and speed of searches, as well as increases the relevancy of the information obtained during these searches compared to prior-art search engines.

Concept networks 100, in general, display a considerable amount of information that is derived based on the structural information (e.g., format, links between nodes, etc.) of the data. In one embodiment, this structural information is obtained based on the Universal Resource Locator (URL), although any device that contains structural information for the retrieved information can be used. In the Internet, the URL is currently used for navigational purposes to allow browsers to access particular Web pages over the Internet. The URL can also be used to provide structural information (that describes the relationship between different nodes) that is used as described in this disclosure to create concept networks. Examples of such structural information involve, for example, one node being an ancestor, an offspring, a sibling, or some other relation to another node. Such structural information is used by a variety of embodiments of concept networks 100 of structurally describe the relationship between different nodes within the concept network.

Such structural information is used in the concept network 100 to provide a taxonomy, or classification, of words. The taxonomy of the concept network (as with prior-art search engines) relates to the meanings of particular words. Prior-art manual search engines have difficulty maintaining a current taxonomy, considering the large numbers of words that have changed meanings or are being added or removed within the search engine. Certain embodiments of the concept network provide an automatically constructed taxonomy that is adaptive to domains and users based on the structure of the Web sites accessed during the query. It is envisioned that concept networks 100, as disclosed herein, can be applied to a large variety of computer systems including, but not limited to: databases, online shopping, cameras, personal computers, handheld computers, machine learning, and computer manufacturing.

While this disclosure describes the concept network 100 being applied to analyze Web sites on the Internet, it should be emphasized that these concepts are applicable to all networked, stand-alone, and other computer-based search engines. As such, the application of the concept network to the Internet, or any network or computer system is within the intended scope of the present disclosure.

The present disclosure describes a variety of embodiments of the concept network 100, and associated components. The concept network 100 is designed to automatically keep itself up to date without any need for updating on behalf of the user. Between queries, one embodiment of the computer environment continually searches in a similar manner that keyword searches cache popular searches such as by using a Web site crawler. One embodiment of the concept network 100 will crawl all the Web sites relating to the collected concepts to keep the concept network up-to-date. The crawling process is envisioned to be similar to those processes performed by traditional search engines.

The concept network 100, within a reasonable amount of time, is able to understand a large number of keywords of typical usage (including their structure) based on the taxonomy produced with the concept network. Using the taxonomy, the concept network displays the keywords in a structured fashion. As such, the concept network is capable of being used as a thesaurus since the concept network is able to interpret the meanings of words based on the taxonomy. The increased number of words in the taxonomy (i.e., dictionaries) of the concept network is therefore especially useful to users that are searching a computer environment such as a network or the Web for a specific technical, legal, or other such specialized word.

Almost all professions have a considerable number of specialized words, many of which are being continuously updated over the years. For example, such professions and groups as attorneys, tax experts, engineers, etc. each have their own taxonomy based on their particular field of use and expertise. The manual search engines do not update many of these terms because of a relatively small number of users for each of these areas. The concept network can automatically update many of these terms that are in specialized, uncommon, or frequently updated usage.

Figure 2:
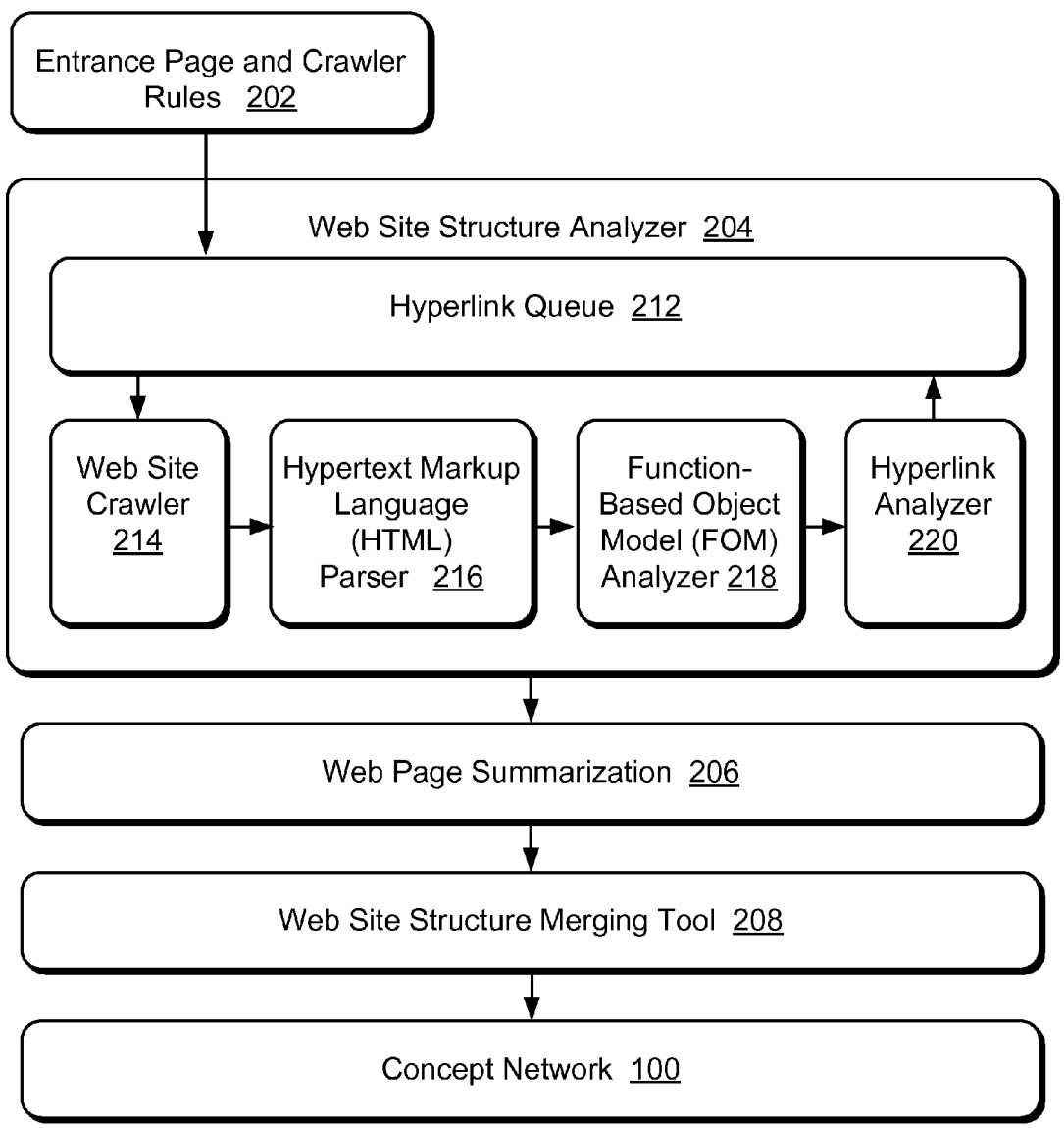
FIG. 2 is a block diagram of another embodiment of a Web site search portion that develops one embodiment of the concept network.

One embodiment of the Web site search portion 201 that is used to derive the concept network 100 is described in FIG. 2. The embodiment of the Web site search portion 201 includes an entrance page and crawler rules portion 202, a Web site structure analyzer 204, a Web page summarization portion 206, a Web site structure merging tool 208, and the concept network 100. The Web site structure analyzer 204 includes a hyperlink queue 212, a Web site crawler 214, an HTML parser 216, a Function-based Object Model (FOM) analyzer 218, and a hyperlink analysis 220.

To produce a concept network 100, the Web site structure analyzer 204 analyzes the structures of Web sites. Then a web merge tool (also referred to herein as the Web site structure merging tool 208 of FIG. 2 merges contents from different ones of the structuralized Web sites to yield the search results that can be displayed using the concept network.

Links are used to navigate in traditional Web sites. To analyze the Web site content structure in order to create each concept network 100, the link is converted from being used for navigation to being used for content. To do this conversion, the following steps are performed.

a) The structured information for each Web site is encoded in the URL. As such, a particular link is encoded in the URL irrespective to whether it is an upward link, a downward link, a sibling link, or a crosswise link. This is not done for prior-art search engines. In one embodiment, this distinguishing of the type of link is performed by the Web site crawler 214 by considering the visiting sequences of the Web site crawler.

b) An aggregation and association analysis is performed. This aggregation and association analysis includes determining the locations of the hubs and the different authorities. In one embodiment, this can be performed by the FOM Analyzer 218.

c) The information link and the navigation link are then distinguished. This identification is performed using a function-based object mode (FOM) to analyze the navigation bar, the navigation list, or the independent link. As such, the page layout is used to segment the Web page. In one embodiment, c) can be performed using the FOM Analyzer 218.

While prior-art search engines provide access to multiple Web sites on a one-at-a-time basis, the concept network 100 is formed to contain structural information obtained from a variety of Web sites simultaneously. The information from this variety of Web pages can be organized in a manner on the concept network 100 that can be easily understood by the user. More particularly, similarly structured information from multiple Web sites can be displayed in the concept network 100 in a manner that presents quantifiable values from the structural information of the multiple Web pages (often based on the URL). Such structural information from the multiple Web pages can then be presented in a manner leading to comparison between the subjects of the different Web pages. For example, multiple companies or groups that deal with a particular industry or topic are likely to contain similar types of information in their Web pages in a similar structure. The concept network provides a vehicle to display this similar information from the different Web pages; or alternatively presents the different but related Web pages to be presented to the user in a manner that permits easy accessing of the different Web pages from the same concept network.

In certain embodiments, the Web site structure analyzer 204 accepts as inputs the enter-point URL of a Web site and some Web site crawler rules from the entrance page and crawler rules portion 202. The URLs contain a variety of structural information that relates to a particular Web page, (e.g., end points of the links, the type of Web page, etc.). This structure provided by the URL is not utilized by traditional search engines for deriving structural information relating to the Web pages. The Web site structure analyzer 204 analyzes the Web site structure and assigns depth information to the Web pages. As a result, one embodiment of the Web site structure analyzer 204 generates a hierarchy graph of the Web site, whose nodes include concepts. The concepts derived by the concept network may be characterized by keywords as described in this disclosure. The Web site structure analyzer 204 leads to the use of a structuralized Web site.

One embodiment of the Web-Site Structure Analyzer 204 is based on BFS (Breath First Search) algorithm. The Web-Site Structure Analyzer 204 maintains the Hyperlink Queue 212. The Web site crawler 214 fetches a URL from the hyperlink queue 212, then crawls the Hypertext Markup Language (HTML) source code from the Internet using the Web site crawler 214, and then forwards the HTML source code to the HTML Parser 216. The hyperlink queue 212 is a queue including unanalyzed hyperlinks. Before the analysis begins, the Web site structure analyzer 204 attaches the enter-point URL. During the analysis, only the Web site crawler 214 fetches the URL from the hyperlink queue 212. Only the hyperlink analyzer 220 applies new unanalyzed hyperlinks.

The enter-point URL of a Web site enters the Hyperlink Queue 212 of the Web site structure analyzer 204 from the entrance page and crawler rules portion 202. When the Web-Site Structure Analyzer 204 begins its analysis, the Web site Crawler 214 fetches the URL from the Hyperlink Queue 212, then the Web site Crawler crawls the HTML source code from the Internet, and forwards the HTML source code to the HTML Parser 216. The HTML parser processes the HTML source code crawled from the Internet.

The HTML Parser 216 accepts the HTML source code that is input from the Web site crawler 214. In one embodiment, the activities of the HTML parser 216 includes URL fetching, URL unification, and URL grouping. For URL fetching, the HTML parser 216 fetches all URLs that point to a Web page and are inside the Web site according to the input Web site definition. Every URL is attached with anchor text. For image link, the anchor is surrounding text.

For URL unification, one embodiment of the HTML parser 216 performs a variety of operations including: a) converting a relative URL address to a direct URL address; b) changing an IP address to a domain name; and c) solving the redirected URL problem by substituting the URL with the final target URL address. For URL grouping, the hyperlinks in a table or list that have the same tag elements and same appearance are likely to be considered, for example, as related nodes. The results from the HTML parser 216 are then forwarded to the Function-based Object Model (FOM) Analyzer 218.

The Function-based Object Model (FOM) Analyzer 218 uses the basic ideal and algorithm of FOM to assign functional information to hyperlinks. This functional information is very useful for analyzing the structure of each Web site. FOM represents a function-based object model for a Web page. Instead of semantic analysis, the FOM Analyzer 218 attempts to understand the authors' intention by identifying each object function and category. Each Web page can function as an index page or a content page. One category of the navigation object is the navigation bar. One embodiment of the FOM Analyzer 218 performs Index/content page recognition and Navigation bar detection as the following FOM analysis tasks.

For the Index/content page recognition, one embodiment of the FOM analyzer 218 determines whether the Web page URL includes the text "index" or "default", and whether the URL is a directory or whether it is an index page. If there is a link inside the page that corresponds to the subdirectory, this link is to the index page. The ratio of the hyperlinks and content words are compared to a threshold value. If the ratio is greater than the threshold value, the Web page is an index-page. If the threshold value is greater than the ratio, the Web page is a content-page.

One embodiment of the FOM analyzer 218 provides navigation bar detection. The items in a navigation bar are interconnected with each other and the corresponding link topology is a completely connected graph. The output of the FOM analyzer 218 includes a plurality of hyperlinks that are forwarded to the hyperlink analyzer 220. The FOM analyzer 218 provides a block segmentation for a Web page. In one embodiment, after segmentation, a Web page is divided into several small units based on their functions, such as content block, navigation block, advertisement block, etc. These small units can be individually accessed by the user.

One embodiment of the Hyperlink Analyzer 220 uses a Web site structure analysis algorithm to handle each hyperlink analyzed by (and transmitted from) the FOM analyzer 218. The parsed source code is forwarded to the FOM analyzer 218 to perform functional analysis. The Hyperlink Analyzer 220 analyzes each hyperlink according to Web-Site Structure Analysis Rules and the new unanalyzed hyperlinks are inserted into the Hyperlink Queue 212. The Hyperlink Analyzer 220 assigns a depth value to each Web page (and maintains the temporary hierarchy graph of Web site). The depth value can be outputted by the Web site crawler 214. In one embodiment, the Web site crawler 214 visits the Web site by breath-first search. The traveling path will be formed as a tree format, the node of the tree is the Web page, and the links within the nodes are the hyperlinks within the Web pages. So the depth of a node in the tree is the value which we wanted to obtain. For example, the depth for an entry point Web page (such as the entry point page identified by the URL http://www.microsoft.com) is 0. The depth for the Web page identified by the URL http://www.microsoft.com/china, by comparison, is 1.

The Web site structure analyzer 204 forms a loop that can be considered as starting and ending at the hyperlink queue 212. The Web site Crawler 214 fetches the next URL from the hyperlink queue 212 to begin the next loop. This is performed until the hyperlink queue 212 is empty of new URLs. The analysis process is accomplished and the hierarchy graph of Web site (called the structuralized Web site) is constructed.

The structured information for each Web site is encoded in the URL in a manner that can be detected using the hyperlink analyzer 220. As such, whether a particular link is an upward link, a downward link, a sibling link, or a crosswise link it is encoded in the URL (and can be detected using the hyperlink analyzer 220). In one embodiment, a heuristic rule based on URL block-length is used to detect an Upward-link and a Forward-link. A URL block-length is defined as a number of blocks, a block is a part of the URL separated by "/" or "?". For instance, the URL block-length of the URL "http://www.sonystyle.com/digital/digital_camera.htm" is 3 including "http://www.sonystyle.com", "digital", and "digital_camera.html". In one embodiment, the restricted rules are applied to analyze the URLs. Then, for the rest URLs which not covered by rules, the above strategies are used to analyze). One embodiment of a Hyperlink Detecting Rule is described according to two rules. The first rule is that if the URL block-length (hyperlink) is less than or equal to the URL block-length of the Web page, then the hyperlink is an Upward-link. The second rule is that if the URL block-length (hyperlink) minus URL block-length (URL of the Web page) is greater than or equal to 2, then the hyperlink is a Forward-link.

Suppose the current Web page node is B, which has a hyperlink to Web page C. The hyperlink analyzer portion 220 of the Web Site Structure Analyzer 204 follows this process:

I. if the hyperlink is upward link, it is dropped (not further considered).

II. If B and C belong to a navigation bar, then B and C are sibling nodes (as described herein).

III. If C has been visited and the URL block-length of B is greater or equal to C:
   If B is an index page; then C is B's child node (as described herein);
   Else if B is a content page, then C is B's sibling node.
IV. If C has not been visited,
   If B is a content page, then C is B's sibling node,
   Else C is B's child node.
   Else if C hasn't been accessed, then
      First if B is a content page or displayed in several pages, the link is explicit association.
      Otherwise the link is an aggregation.

After analyzing the URL in the hyperlink queue, the Web site structure is derived using the Web page summarization portion 206. For instance, a certain amount of data contained in a Web page may be relevant to a particular user's query, while other data is not relevant. The Web page summarization provides the relevant information in a form that can be displayed over a particular concept section within the concept network 100. Since the entirety of each Web page is not illustrated over the concept network, the concept network can provide a more directed summary of the information of each concept or Web page that can be accessed by the user. The varied contents of the different Web pages (or other contents) that are derived from the Web page summarization portion 206 are then merged into the concept network 100 using the Web site structure merging tool 208. The Web site structure is represented with a hierarchy graph.

Certain embodiments of the concept network 100 analyze the structure of relevant Web sites, and thereupon merge the results together. This merging of the information from a plurality of Web sites is referred to in this disclosure as a web merge as performed by the Web site Structure Merging Tool 208 as illustrated in FIG. 2. The web merge performed by the Web site Structure Merging Tool 208 improves the precision and speed of the concept network and is performed as follows.

After each Web site is structuralized into the "tree-like graph" or "depth-level graph", the next problem is to merge these graphs into a network. In the network, each node represents one concept and the links between these nodes represent the relationships between these concepts. The basic relationships may include, but are not limited to hypemyms, hyponyms, synonyms, etc. Since each Web site represent the original editor's view on the related topics, it is a little difficult to merge the different views into one view. So in the following, we give a solution to merge the concept hierarchy from all kinds of sources into one usable hierarchy.

To illustrate one embodiment of how to merge the hierarchy of the concept network, one kind of relationship R for a given concept C is merged from two different hierarchies H. A detailed algorithm to solve this problem follows:

The following technique represents one embodiment that can be used to perform the ontology merging procedure:

a) For each Web block, the concepts are summarized for a Web page using the Web page summarization portion 206 as shown in FIG. 2. The concepts are interpreted as a set of keywords.

b) The concepts are then tokenized by which each concept that is to be generated and displayed over the concept network 100 is represented by a "token" phrase or keyword. As such, a set of keywords are established to represent and describe the concepts contained in the concept network. (1) is used to eventually yield the concepts:

$$n_i = [w_{i1}, w_{i2}, \ldots, w_{im}] \quad (1)$$

where $w_{i1}, w_{i2}, \ldots, w_{im}$ represent words, and $n_i$ represents the array of words $n_i$ is the summary for a node (Web page) in concept network, it can be decomposed into several words/phrases, i.e. $w_{i1}, w_{i2}, \ldots, w_{im}$ c) A gliding window is provided over the hierarchy tree to generate the sub-tree ST of the offspring, ancestor, and sibling respectively using (2), (3), and (4). It is assumed that some words appear in different windows.

$$ST_i(\text{offspring}) = (n_i, \text{sons}_1(n_i), \ldots, \text{sons}_d(n_i)) \quad (2)$$

$$ST_i(\text{ancestor}) = (n_i, \text{parents}_1(n_i), \ldots, \text{parent}_d(n_i)) \quad (3)$$

$$ST_i(\text{sibling}) = (n_i, \text{sibs}_1(n_i), \ldots, \text{sibs}_d(n_i)) \quad (4)$$

where, $ST_i(\text{offspring})$, $ST_i(\text{ancestor})$, and $ST_i(\text{sibling})$ is the sub-tree for calculating the offspring, ancestor and sibling relationship; $\text{sons}_d$, $\text{parents}_d$ and $\text{sibs}_d$ stands for the $d^{th}$ level's son nodes, parent nodes and sibling nodes for node $n_i$ separately.

d) For each generated sub-tree (e.g. $ST_i(\text{ancestor})$), the mutual information of a term-pair is counted as Equation (5). The mutual information MI for each word pair $w_i$, $w_j$ is calculated. The mutual information having a high value indicates that the pair of words are similar.

$$MI(w_i, w_j) = P_r(w_i, w_j) \log \frac{P_r(w_i, w_j)}{P_r(w_i) P_r(w_j)} \quad (5)$$

$$P_r(w_i, w_j) = \frac{C(w_i, w_j)}{\sum_k \sum_l C(w_k, w_l)} \quad (6)$$

$$P_r(w_i) = \frac{C(w_i)}{\sum_k C(w_k)} \quad (7)$$

$$P_r(w_j) = \frac{C(w_j)}{\sum_k C(w_k)} \quad (8)$$

where, $MI(w_i, w_j)$ is the mutual information of term $w_i$ and $w_j$; $Pr(w_i, w_j)$ stands for the probability that term $w_i$ and $w_j$ appears together in the sub-tree; $Pr(x)$ (x can be $w_i$ or $w_j$) stands for the probability that term x appears in the sub-tree.

Another factor to determine the relevance if a pair of terms is the distribution of the term-pair. The more sub-trees contain the term-pair, the more similar the two terms are. In our implementation, entropy is used to measure the distribution of the term pair, as shown in step (d)

d) Calculate the entropy for each word pair $w_i$, $w_j$. The entropy conversion is a measure of the pair $w_i$, $w_j$ of words that were determined to be common, based on the mutual information determined in (5) actually being common in all of the Web sites. The higher the entropy is, the more confidence that the concept network can provide to the user that the word pairs among all of the Web sites.

$$\text{entropy}(w_i, w_j) = -\sum_{k=1}^{N} P_r(w_i, w_j) \log P_r(w_i, w_j) \quad (9)$$

$$p_k(w_i, w_j) = \frac{C(w_i, w_j \mid ST_k)}{\sum_{l=1}^{N} C(w_i, w_j \mid ST_l)} \quad (10)$$

e) Calculate the similarity Sim for each word pairs as per (11):

$$Sim(w_i, w_j) = MI(w_i, w_j) \times \frac{entropy\ (w_i, w_j) + 1}{\alpha \log(N)} \qquad (11)$$

The similarity as set forth in (11) combines mutual information $MI(w_i, w_j)$ and entropy $(w_i, w_j)$.

To indicate the related concepts (offspring, ancestor, and sibling) that relate to (2), (3), and (4), the concepts network produces a variety of related categories. For instance, Table 1 illustrates a variety of exemplary offspring concepts for well known concepts:

TABLE 1

Offspring Concepts

| Original Category | Offspring |
|---|---|
| Software | utility, game, business, general, graphic, database |
| Video | DVD, TV, projection, camcorder |
| Fiction | story, drama, horror, poetry, science, romance |
| Apparel | clothing, women's, shirt, shoe, accessory, men's, sport, costume, children's |
| Shoe | boot, heel, sandal, slipper, casual |
| Pet | care, supply, bird, cat, dog, fish, food, service |

Table 2 illustrates a variety of exemplary Ancestor concepts:

TABLE 2

Ancestor Concepts

| Original Category | Ancestor |
|---|---|
| Software | Computer |
| Video | electronics, component |
| Fiction | book, literature |
| Apparel | Not applicable |
| Shoe | women's, man's, apparel |
| Pet | Not applicable |

Table 3 illustrates a variety of exemplary Sibling concepts:

TABLE 3

Sibling Concepts

| Original Category | Sibling |
|---|---|
| Software | hardware, network, apparel, storage, peripheral, memory |
| Video | audio, photography, camera, accessory |
| Fiction | cookery, history, sport, travel, author, comic |
| Apparel | Fashion, software, beauty, music, pet |
| Shoe | Clothing, watch, coat, shirt, swimwear, pant |
| Pet | Gift, sports, toy, jewelry, book |

One embodiment of the concept network 100 as illustrated in FIG. 2 is provided as a directed graph that is illustrated in structural form in FIG. 3, and in a form that it may appear to a user in FIG. 4. The directed graph (G) 300 that the concept network is based on is described by (12):

$$G = (V, E) \qquad (12)$$

Where V is a collection of nodes and E is a collection of edges or links. As such, the concept network 100 as represented by the directed graph includes a plurality of nodes and a plurality of links or edges connecting the nodes. The nodes represent concepts. The edges or links represent the relationships between the concepts. The directed graph 300 as shown in FIG. 4 of the concept network 100 thereby provides the content structure. The content structure of the Web pages is information mined to yield information that is used to produce the concept network.

FIG. 3 illustrates one embodiment of a technique for constructing a taxonomy for a particular domain using the concept network 100. FIG. 3 starts with a derivation of one or more domain specific Web sites 302. This can be accomplished by leveraging an existing meta-search engine to do this job. For example, if a user desires to construct the concept network for "digital camera" domain, the user can send the query to search engine and use the top 100 Web sites to construct the concept network. Each Domain Specific Web site 302 includes structure corresponding to an analysis of content (represented by the nodes) and an analysis of the link structure (represented by the link structure).

Producing the concept network 100 relies on efficient mining of the content structure of one or more Web sites. This mining can be performed by analyzing the link type, that determines whether the link is an offspring link, an ancestor link, or a sibling link such as described relative to the hyper-link analyzer 220 of FIG. 2. One of these link types is assigned to each link. The semantic of the node is then summarized using the Web page summarization portion 206 as shown in FIG. 2. In FIG. 3, the domain specific taxonomy is derived based on this information mining. Note that the derivation of the domain specific taxonomy is performed automatically in the present disclosure, compared to such prior-art tools as WordNet® that require manual editor input for taxonomy. Wordnet is a manually constructed taxonomy for general domain. This taxonomy is constructed by editor instead of end-user. The information mining relies on the link structure and the content of the domain specific Web sites. This differs from certain prior-art automatic thesaurus constructions in which the information is mined from the content instead of link structure.

The concept network 100 is then constructed using ontology learning. Based on the ontology learning, the automatically constructed concept network develops its own taxonomy. The ontology learning is based on a statistical framework, and is capable of yielding multiple editors' views. The statistical framework is easily applied to many statistical applications. The concept network 100 that is constructed as shown in FIG. 3 describes a variety of concept networks for electronics. The concept network 100 includes a variety of Web blocks 450, with each Web block representing a different category of electronics (e.g., an electronics product, an electronic category, and electronic device manufacturer, etc.).

Each Web block is described by a keyword which is recognizable by users. Each sub Web block 454 can be considered as related to the primary Web block. For example, in FIG. 3, the word "electronics" represents the primary Web block 452. The term "electronics" represents a good primary Web block 452 because this term appears in many Web sites pertaining to a variety of products (each of the variety of products may be considered as a sub Web block). For example, in FIG. 3, a variety of sub Web blocks 454 (including cameras and photos, audio and video, handheld, cell phones, computers, Sony®, iPAQ®, Palm®, Accessories, and a variety of Compaq® products) are illustrated under the electronics primary Web block. Each web block is considered to be a concept that contains homogenous information within this disclosure. The term "concept network" therefore describes a network of multiple concepts, or Web blocks.

Each Web block can be summarized by a keyword (such as camera, computers, and "Sony" as illustrated in FIG. 3). The subject of each sub Web block in FIG. 3 relates heavily to the primary Web block electronics, and can therefore be classified broadly under the concept "electronics". Based on the structure of the Web blocks, the mining, and the domain specific taxonomy of the concept network 100, the concept network for electronics as illustrated in FIG. 3 contains many of these terms. The yielded concept network 100 illustrated in FIG. 3 may be considered as the end result that is automatically constructed.

One embodiment of an illustrative concept network 100, as it would appear on a computer display 200 such as a flat panel display or a CRT monitor, is illustrated in FIG. 4. As such, FIG. 4 illustrates the generated concept network 100 (using the techniques illustrated in FIGS. 2 and 3) including a variety of concepts 402. Each concept 402 includes information pertaining to at least one of the Web blocks 450 that has been generated in the manner, certain embodiments of which are illustrated in FIG. 3. The concept network 100 illustrated in FIG. 4 therefore contains a number of concepts 402 that are tiled on the display. The details of the concept network are relatively detailed as to the area of interest (in this instance "electronics"). For instance, several of the concepts, if selected by a user, bring the user to another concept network that may be narrower or broader than the concept network currently displayed. For instance, a user can transfer from an electronics concept network to a computer concept network.

An analysis of the concept network was performed by searching through a variety of Web sites. The analysis indicated an improvement (to 75 percent) in the percentage of Web sites that were correctly located in certain implementations of the concept network. This represents a considerable improvement over the prior-art as far as accuracy is concerned.

Consider the illustrative query "digital camera manufacturer". Typical prior-art search engines search the entire web and return those Web pages that contain the key terms "digital" and/or "camera" and/or "manufacturer". Such prior-art search engines will therefore return a considerable number of unrelated Web pages.

The concept network 100 needs only to search a sub-graph that expands from the node "digital camera". As such, the concept network is faster, and the number of returned irrelevant Web pages is reduced considerably.

The concept network 100 increases the ease, speed, and reliability of the desired response to the query. First, the term "digital camera" is located in the concept network 100. All the nodes that are pointed to or pointed from the node "digital camera" are extracted. Then the nodes whose properties are "manufacturer" are selected, and ranked (e.g., based on hit numbers). As such, a query for the top N of any category (largest company, largest producer, most offices, nearest locations, etc.) of Web pages can be searched, and the probability of netting a reasonable number of accurate hits is greatly increased.

Such improved searching characteristics by the concept network occur because the query is directed at the structure of the searched Web sites (as contained within the URL). Certain embodiments of the concept network 100 as described relative to FIG. 5 can provide a variety of search services that can search for some quantifiable parameter of the top "N" (where "N" is some positive number) organizations, companies, items, groups, products, etc. as listed on Web sites on the Internet. For example, certain embodiments produce a concept network 100 that provides a search result for a query to find out the top five digital camera manufacturers in the world. Another query provides the search results for another complex query such as indicating the top five steel producing companies in Europe. One type of query in which the concept network is intended to be highly beneficial relies on accessing data based on the structure of the Web sites (e.g., based on the structure provided by the URL). The "top N" type query analyzes and returns information based on the structure of multiple Web sites. For example, one technique is to determine who are the top three automobile producers in the United States involves accessing the Web sites of all of the potential automobile producers, deriving similar production information from each Web site, and then comparing the derived production information from the different Web sites. As such, certain embodiments of the concept network 100 can search for detailed features within a Web page.

Data mining is directed to such Web site analysis. Generally, data mining (sometimes called data or knowledge discovery) is the process of analyzing data from different perspectives and summarizing it into useful information to the user based on the query. Data mining software is one of a number of analytical tools for analyzing data. It allows users to analyze data from many different dimensions or angles, categorize it, and summarize the relationships identified. Technically, data mining is the process of finding correlations or patterns among dozens of fields in large relational databases, and is generally well known in queries. As such, certain embodiments of the concept network can use data mining 306 as provided by FIG. 3 to derive a domain specific taxonomy 304.

Figure 5:
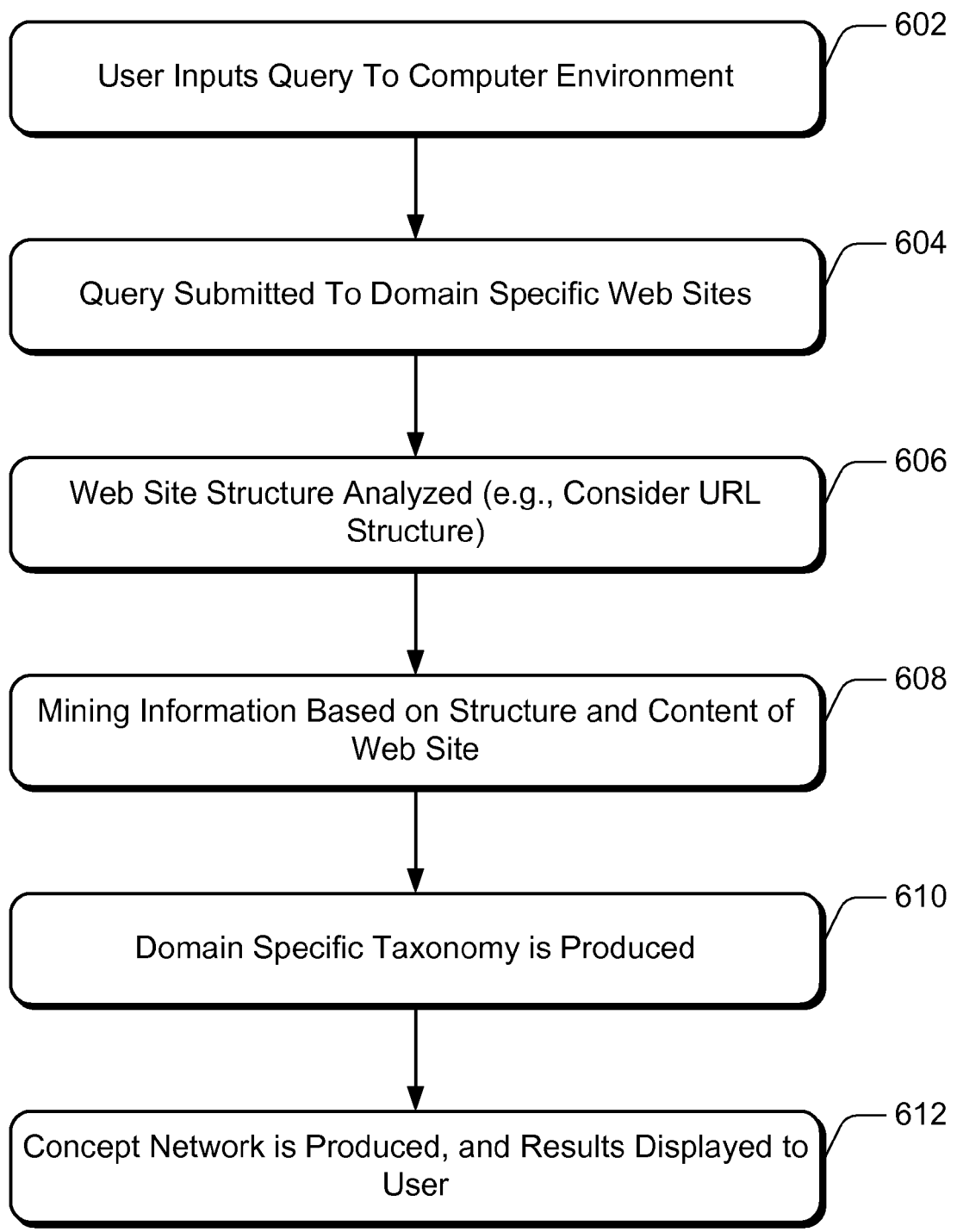
FIG. 5 illustrates a flow chart of one embodiment of a Web Site Structure Analysis algorithm.

FIG. 5 illustrates one embodiment of a process 600 that results in producing the concept network. The process 600 includes 602 in which a user inputs a query into the computer environment 50 (as shown in FIG. 1). The query will result in the concept network being produced and displayed to the user. The query is submitted to a plurality of domain-specific Web sites 302 as described relative to FIG. 3 in 604. These Web sites are returned by a popular meta-search engines or human-built web hierarchy. In 606, the computer environment analyzes the Web site structure, such as by considering the URLs of the associated Web sites. In 608, information is mined based on the structure and content of the Web sites. The information mined is used to produce the domain specific taxonomy in 610 (as described relative to 304 in FIG. 3). The process 600 continues to 612 in which the concept network 100 is produced and displayed to the user.

The concept network 100 is capable of being produced to return accurate responses to such queries as "explain the word: electronics" (which prior-art search engines can not perform). Such concept networks 100 are also generated (as is the case in the FIG. 5 query) by analyzing the structure of the various Web sites and Web pages. One embodiment of the concept network saves the structure information of Web sites, which represents the editor's view on the hierarchy of the concept. In the concept network 100, different editor's views are merged together, so users can determine what is the most popular explanation.

Certain other embodiments of the concept network 100 can provide a query that have determined the best Web sites for performing a task such as explaining the word "electronics". This type of query can be considered a query to explain and/or compare. As such, a number of Web sites have to be evaluated and compared by the concept network. One mechanism that is involved to produce such concept networks (such as a concept network that can explain complex issues) involves considering a large number of Web sites that relate to the issue posed by the query; somehow measurably considering the relevancy of each Web site as is performed by prior-art search engines, and then displaying to the user of the concept network relevant portions of the Web page. The FIG. 5 embodiment of process 600 can be used to perform this type of query as well.

To respond to these types of relatively complex queries (either the top-N type query or a query that has to evaluate and compare multiple Web sites, etc.), the concept network 100 is constructed by evaluating the structure of each Web page or Web site considered. The prior-art search engines are not capable of deriving the structure from the Web sites in order to perform these analyses (and therefore are not able to respond to such queries). For example, relative to the electronics example, the concept network considers those Web pages that are structured to provide enough information that is sufficiently directed at accurately describing the electronics topic.

The concept network 100 is also very useful in query expansion. Currently, many Internet applications utilize the prior-art manual tool WordNet to expand the user's query to improve the precision of existing search engines. WordNet, however, is built which is a labor-intensive job to construct (the thesaurus) manually. Almost no Web site prefers to construct the thesaurus by hand. The Web site operators prefer to automate thesaurus construction. Manual thesaurus construction by the user is not suitable for the rapid growth of the Internet. The number of documents in such networks as the Internet continue to grow. More and more new words and concepts continue appearing that highlight the usefulness of the concept network as described in the present disclosure. The concept network returns fewer, but more directed, results as compared to the prior-art search engines that rely on keyword comparison. As such, it becomes easier for a user to evaluate each result returned by the concept network. In addition, it becomes easier for a user to evaluate if a query is not returning the desired types of results, and therefore the user will be able to modify the original query to be more directed.

A live thesaurus (which the concept network can function as) is useful for Internet and other network searches. Moreover, the concept network 100 not only contains the hierarchy of the concepts, but also contains the statistical information for these concepts. So it can be easily applied to some specific questions about popularity, such as a survey.

Since one embodiment of the concept network 100 merges the view on the words and concepts from all the authors for the Internet and other network environments, the concept network 100 may be considered as providing an alternative thesaurus for the network users. The concept network 100 can be adapted to the client side as a personal thesaurus. The user's browsing paths will generate a sub-space of the Web. A similar method can be applied to analyze the sub-space of the Web to generate the relationships of personal frequently used concepts.

The concept network therefore provides for summarization for a Web page. Text over the hyperlink and the page title can be used as the summarization of a Web page. In another embodiment, a natural language parse (NLP) technique can be integrated in the Web site search portion 201 (perhaps as a portion of the HTML parser 216) to summarize the document using some dominant keywords.

This disclosure describes a variety of the concept networks 100. The concept network can be considered as an Internet concept network built from the Web site by analyzing the structure of a plurality of the Web sites and merging the analysis results. The concept network 100 may be especially useful for improving the precision and speed of search engine. The concept network extracts knowledge from Web site structure rather than solely plain text contained within the Web site. The concept network provides automatic construction for a domain. The statistical results from a concept network reveal the general knowledge contained in a variety of Web sites.

As such, the concept network not only obtains information from a particular Web site, but obtains knowledge from a large variety of Web sites over the network. The concept network can use ontology learning to maintain the structure information relating to the Web sites. Therefore, as new Web pages and concepts are applied to the Internet, ontology allows the structural information from the Web pages to be automatically integrated into the concept network. Furthermore, the concept network 100 can provide some services that common search engine can not do, such as "find out the Top N digital camera manufacturers in the world" and "explain the word: electronics". The concept network can also function as a live Internet thesaurus for query expansion since it provides such a variety of sub Web blocks that are related to each other through a primary Web block as illustrated in FIG. 3.

Figure 6:
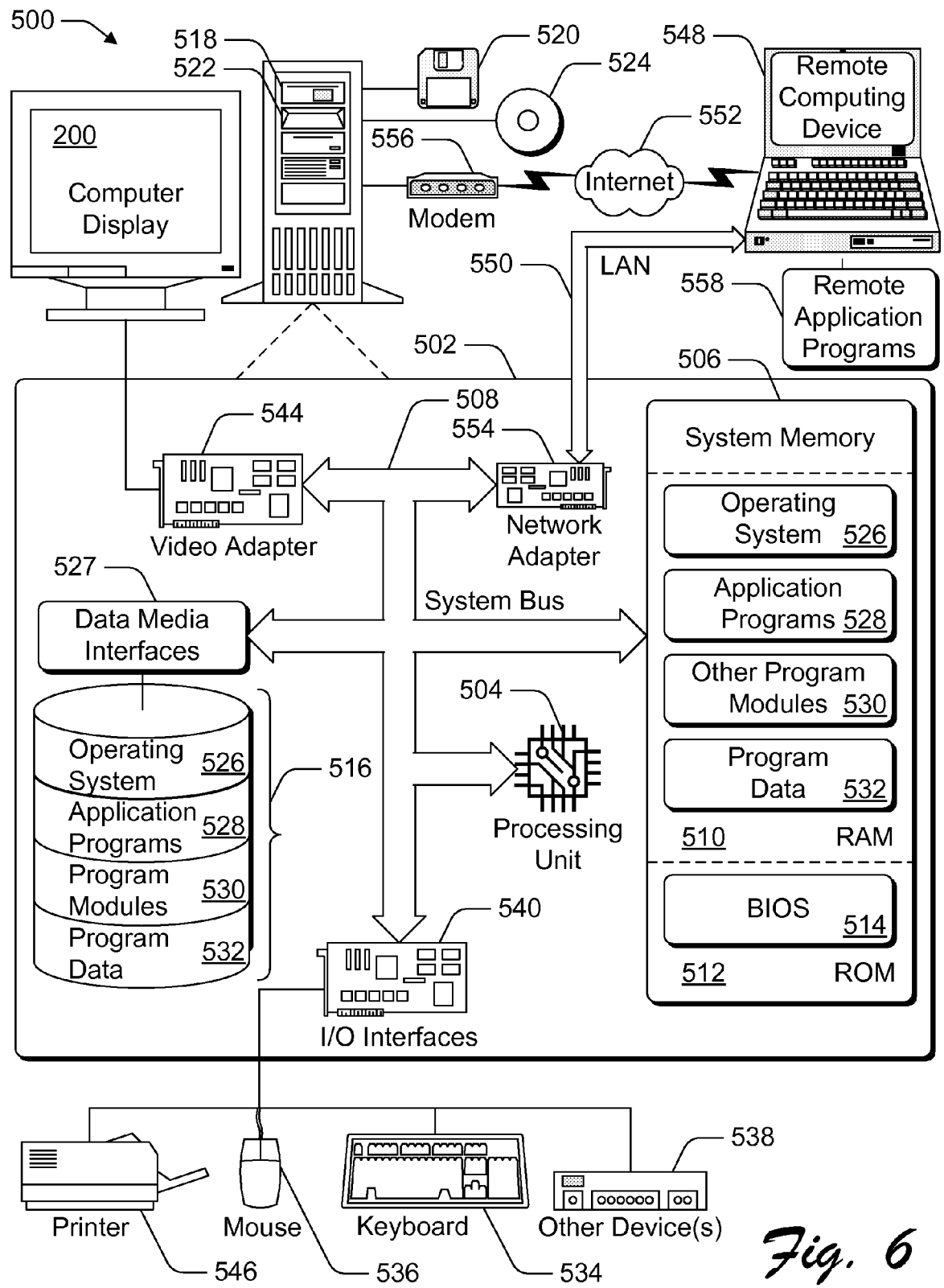
FIG. 6 illustrated a block diagram of one embodiment of a computer environment that may be used to derive or display a concept network to a user.

FIG. 6 illustrates an example of a suitable computer environment or network 500 which includes a user interface that can produce a concept network. The computer environment 500 represents one embodiment of the computer environment 50 illustrated in FIG. 1. Similar resources may use the computer environment and the processes described herein.

The computer environment 500 illustrated in FIG. 6 is a general computer environment, which can be used to implement the concept network techniques described herein. The computer environment 500 is only one example of a computer environment and is not intended to suggest any limitation as to the scope of use or functionality of the computer and network architectures. Neither should the computer environment 100 be interpreted as having any dependency or requirement relating to any one or combination of components illustrated in the exemplary computer environment 500.

The computer environment 100 includes a general-purpose computing device in the form of a computer 502. The computer 502 can include, for example, one or more from the group including a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 6 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 515, a removable magnetic disk 520, and a non-volatile optical disk 524, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 500.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of a computer display 200 can also be connected to the system bus 508 via an interface, such as a video adapter 544. In addition to the computer display 200, other output peripheral devices can include components such as speakers (not shown) and a printer 546 which can be connected to the computer 502 via the input/output interfaces 540.

The computer 502 can operate in a networked environment using logical connections to one or more remote computers, such as a remote computer device 548. By way of example, the remote computer device 548 can be a personal computer, a portable computer, a server, a router, a network computer, a peer device or other common network node, game console, and the like. The remote computer device 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer 7 environment 500, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete Web blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects 650, components, control node data structures 654, etc. that perform particular tasks or implement particular abstract data types. Typically, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A method comprising:
under control of one or more processors configured with executable instructions:
receiving a plurality of Universal Resource Locators (URLs) of one or more Web sites that correspond to a plurality of Web pages;
analyzing the plurality of URLs to determine the content of the plurality of URLs and structure information of the one or more Web sites; and
structuring a plurality of web blocks into a concept network based on information contained within the analyzed plurality of URLs and structure information of the one or more Web sites.

2. The method of claim 1, further comprising displaying the concept network.

3. The method of claim 2, further comprising receiving user input in response to the displayed concept network.

4. The method of claim 1, further comprising determining whether a particular link is an upward link, a downward link, a sibling link, or a crosswise link based on a URL.

5. A method comprising:
under control of one or more processors configured with executable instructions:
accessing a plurality of domain-specific Web sites;
mining information based on structure information and relative content of the plurality of domain-specific Web sites, the structure information comprising information based at least in part on Universal Resource Locators (URLs) associated with the plurality of domain-specific Web sites, the information including link types of the URLs, the link types including one or more of an offspring link, an ancestor link, or a sibling link;
automatically constructing a domain specific taxonomy based on the mined information including the link types; and
formulating a concept network based on the domain specific taxonomy.

6. The method of claim 5, wherein the information mining is based on link structure and content.

7. The method of claim 5, wherein the concept network is formulated based on entropy.

8. The method of claim 5, wherein the concept network is formulated based on mutual information.

9. The method of claim 5, wherein the concept network is formulated based on similarity.

10. A method comprising:
under control of one or more processors configured with executable instructions:
generating a concept network, the generation including:
analyzing structure information about a first Web site and a second Web site, the structure information comprising information based at least in part on Universal Resource Locators (URLs) associated with the first Web site and the second Web site;
structuring URLs in the first Web site into a first set of concept network nodes and URLs in the second Web site into a second set of concept network nodes based on a result of the analyzed structure information; and
merging the first set of concept network nodes with the second set of concept network nodes based on a measure of mutual information between at least one of the first set of concept network nodes and at least one of the second set of concept network nodes.

11. The method of claim 10, wherein the structural information comprises information based at least in part on hidden concepts within each Web page.

12. A method comprising:
under control of one or more processors configured with executable instructions:
generating a concept network, the generation including
analyzing structure information about a plurality of data storage locations based on a query submitted from a user, the structure information comprising information based at least in part on Universal Resource Locators (URLs) associated with the plurality of data storage locations;
grouping a first set of data storage locations into a first set of concept network nodes and a second set of data storage locations into a second set of concept network nodes; and
merging the first set of concept network nodes with the second set of concept network nodes based on a measure of mutual information between at least one of the first set of concept network nodes and at least one of the second set of concept network nodes.

13. The method of claim 12, wherein the structural information comprises information based at least in part on hidden concepts within each data storage locations.

14. The method of claim 12, wherein the data storage location comprises a Web page.

15. A computer readable medium having computer executable instructions for generating a concept network, comprising:
analyzing structure information about a first Web site and a second Web site based on a query submitted from a user, the structure information comprising information based at least in part on Universal Resource Locators (URLs) associated with the first Web site and the second Web site;
structuring URLs in the first Web site into a first set of concept network nodes and URLs in the second Web site into a second set of concept network nodes based on a result of the analyzed structure information; and
merging the first set of concept network nodes with the second set of concept network nodes based on a measure of mutual information between at least one of the first set of concept network nodes and at least one of the second set of concept network nodes.

16. A method comprising:
under control of one or more processors configured with executable instructions:

automatically deriving a domain specific taxonomy, the deriving including:

analyzing structure information about a plurality of data storage locations based on a query submitted from a user, the structure information comprising information based at least in part on Universal Resource Locators (URLs) associated with the plurality of data storage locations;

grouping a first set of data storage locations into a first set of hierarchical concept network nodes and a second set of data storage locations into a second set of hierarchical concept network nodes; and merging the first set of hierarchical concept network nodes with the second set of hierarchical concept network nodes based on a measure of similarity between at least one of the first set of hierarchical concept network nodes and at least one of the second set of hierarchical concept network nodes.

* * * * *